United States Patent
Takeda et al.

(10) Patent No.: US 12,289,661 B2
(45) Date of Patent: Apr. 29, 2025

(54) RELAY APPARATUS FOR RELAY COMMUNICATION, CONTROL METHOD, AND STORAGE MEDIUM

(71) Applicant: KDDI CORPORATION, Tokyo (JP)

(72) Inventors: Hiroki Takeda, Tokyo (JP); Shingo Watanabe, Tokyo (JP)

(73) Assignee: KDDI CORPORATION, Tokyo (JP)

( * ) Notice: Subject to any disclaimer, the term of this patent is extended or adjusted under 35 U.S.C. 154(b) by 354 days.

(21) Appl. No.: 17/859,896

(22) Filed: Jul. 7, 2022

(65) Prior Publication Data

US 2022/0345983 A1    Oct. 27, 2022

Related U.S. Application Data

(63) Continuation of application No. PCT/JP2020/034030, filed on Sep. 9, 2020.

(30) Foreign Application Priority Data

Feb. 6, 2020   (JP) .................................. 2020-019112

(51) Int. Cl.
 *H04W 40/22*   (2009.01)
(52) U.S. Cl.
 CPC .................................. *H04W 40/22* (2013.01)
(58) Field of Classification Search
 None
 See application file for complete search history.

(56) References Cited

U.S. PATENT DOCUMENTS

| 2019/0053193 | A1* | 2/2019 | Park | H04W 72/51 |
| 2021/0160735 | A1* | 5/2021 | Fujishiro | H04W 76/18 |
| 2021/0259051 | A1* | 8/2021 | Latheef | H04W 76/12 |

OTHER PUBLICATIONS

International Search Report with English Translation and Written Opinion mailed Nov. 24, 2020 in corresponding International Application No. PCT/JP2020/034030; 8 pages.
3GPP, TR38.874, V16.0.0, Dec. 2018; 111 pages.
Samsung, Overview on IAB node reestablishment [online], 3GPP TSG RAN WG3 #104 R3-192612, May 2, 2019; 3 pages.
Samsung, Overview on IAB node migration [online], 3GPP TSG RAN WG3 #104 R3-192613, May 2, 2019; 4 pages.

(Continued)

*Primary Examiner* — Diane L Lo
(74) *Attorney, Agent, or Firm* — Foley & Lardner LLP

(57) ABSTRACT

A relay apparatus for wirelessly relaying communication between a base station apparatus and a terminal apparatus determines, when a connection destination apparatus of wireless connection in a relay path is changed while being connected to a first base station apparatus via a relay path, whether a base station apparatus connected via the changed connection destination apparatus is the first base station apparatus or a second base station apparatus different from the first base station apparatus, and executes, when the base station apparatus connected via the changed connection destination apparatus is the second base station apparatus, first setting concerning a relay path after the change, and executing, when the base station apparatus connected via the changed connection destination apparatus is the first base station apparatus, second setting different from the first setting and concerning a relay path after the change.

13 Claims, 2 Drawing Sheets

(56) References Cited

OTHER PUBLICATIONS

Samsung, Further discussion on IP address issues of IAB network [online], 3GPP TSG RAN WG3 #105 R3-193979, Aug. 16, 2019; 7 pages.

Nokia, Nokia Shanghai Bell, Discussion on Forwarding Table Configuration [online], 3GPP TSG RAN WG3 #106 R3-196759, Nov. 9, 2019; 5 pages.

* cited by examiner

RELAY APPARATUS FOR RELAY COMMUNICATION, CONTROL METHOD, AND STORAGE MEDIUM

CROSS-REFERENCE TO RELATED APPLICATION(S)

This application is a continuation of International Patent Application No. PCT/JP2020/034030 filed on Sep. 9, 2020, which claims priority to and the benefit of Japanese Patent Application No. 2020-019112 filed Feb. 6, 2020, the entire disclosures of which are incorporated herein by reference.

BACKGROUND OF THE INVENTION

Field of the Invention

The present invention relates to a relay apparatus, a control method, and a storage medium and, more particularly, to a path setting technique in relay communication.

Description of the Related Art

In the 3rd Generation Partnership Project (3GPP), a technique in which a method in which a terminal apparatus accesses a network is applied to a backhaul link to be usable in a 5th generation (5G) wireless communication network has been examined (see 3GPP, TR38.874, V16.0.0, December 2018). This technique is called Integrated Access and Backhaul (IAB). For example, a relay apparatus called an IAB node establishes connection to a 5G base station apparatus (APB donor) using a radio link. At this time, the IAB node may directly be connected to the IAB donor by establishing a radio link, or may indirectly be connected to the IAB donor by establishing a radio link with another IAB node directly or indirectly connected to the IAB donor. In this system, in the IAB donor, each relay path formed via each IAB node is added with an identifier for identifying the relay path. A transmission target signal is transmitted by including, as information indicating a path via which the signal should be relayed, an identifier called a BAP routing ID corresponding to one of the relay paths. Note that BAP is formed by the initials of Backhaul Adaptation Protocol. Furthermore, the signal includes destination information indicating a terminal node (for example, a node that has established a radio link directly with a terminal apparatus in a downlink) in the relay path. Each IAB node stores, in association with each other, the identifier of each relay path and information for specifying the next transfer destination IAB node of the signal in each relay path. Upon receiving a signal, the IAB node determines whether the self-apparatus is the terminal node in the relay path of the signal. If the self-apparatus is the terminal node in the relay path, the IAB node transmits the signal to a terminal apparatus being connected to the self-apparatus without transferring the signal to another IAB node. On the other hand, if the self-apparatus is not the terminal node in the relay path, the IAB node confirms the identifier of the relay path included in the signal, and specifies, in accordance with the identifier, another IAB node stored in the self-apparatus. Then, the IAB node transfers the signal to the specified other IAB node. This allows the base station apparatus to provide a communication service to terminal apparatuses within a wide range.

SUMMARY OF THE INVENTION

The present invention provides a technique for making it possible to apply, to various statuses, communication using a relay path.

A relay apparatus according to one aspect of the present invention is a relay apparatus for wirelessly relaying communication between a base station apparatus and a terminal apparatus, comprising a determination unit configured to determine, when a connection destination apparatus of wireless connection in a relay path is changed while being connected to a first base station apparatus via a relay path, whether a base station apparatus connected via the changed connection destination apparatus is the first base station apparatus or a second base station apparatus different from the first base station apparatus, and a setting unit configured to execute, when the base station apparatus connected via the changed connection destination apparatus is the second base station apparatus, first setting concerning a relay path after the change, and executing, when the base station apparatus connected via the changed connection destination apparatus is the first base station apparatus, second setting different from the first setting and concerning a relay path after the change.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain principles of the invention.

DESCRIPTION OF THE EMBODIMENTS

Figure 1:
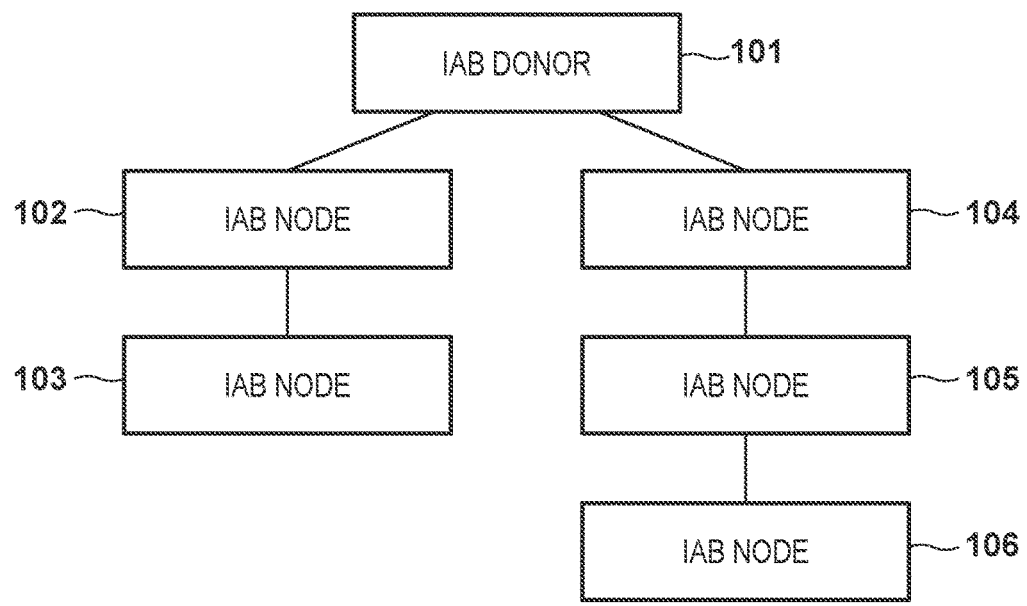
FIG. 1 is a block diagram showing an example of the configuration of a wireless communication system.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

(System Configuration)

FIG. 1 shows an example of the configuration of a wireless communication system according to an embodiment. The wireless communication system of this embodiment performs relay transmission by including a base station apparatus (IAB donor) and a relay apparatus (IAB node), as described above. Note that FIG. 1 shows only an IAB donor and IAB nodes for the sake of descriptive simplicity but a terminal apparatus that establishes a radio link with each of these apparatuses to perform communication can exist as a matter of course. Note that the IAB donor includes a central unit (CU) that executes various kinds of control operations, and a distributed unit (DU) having the same function as that of other nodes, and the IAB node includes a DU. A control message by the CU of the IAB donor is transferred to another IAB node via the DU of the IAB donor, and a control message from the IAB node is transferred to the CU of the IAB donor via the DU of the IAB donor. Note that for the sake of descriptive simplicity, the IAB donor will be described without discriminating between the CU and the DU unless it is necessary to discriminate between them. Furthermore, FIG. 1 shows one IAB donor and five IAB nodes for the sake of descriptive simplicity but a plurality of IAB donors may exist and the number of IAB nodes connected to each IAB donor may be four or less or six or more. For example, the IAB donor can transmit/receive a signal to/from a terminal apparatus connected to the self-apparatus, and also transmit/receive, via one or more IAB nodes, a signal to/from a terminal apparatus that has established wireless connection to at least one of the IAB nodes. Note that the IAB donor will sometimes simply be referred to as a donor hereinafter and the IAB node will sometimes be referred to as a relay node or a node hereinafter.

Each relay node establishes, in a state in which it is not connected to the donor, connection to the donor directly or via one of other relay nodes that have established connections to the donor. When establishing connection, the relay node establishes connection as a terminal. Note that the relay node may actually establish connection to another relay node. In this case as well, when the other relay node transfers a signal between the donor and the relay node, the relay node can establish connection to the donor.

When the relay node establishes RRC (Radio Resource Control) connection to the donor, the donor sets, in the relay node, the address (BAP address) of the relay node in BAP and the identifier (BAP routing ID) of a relay path concerning the relay node. Note that when setting the identifier of the relay path, the next transfer destination of a signal in the relay path is set. For example, referring to FIG. 1, when a node 106 establishes connection to a donor 101 via a node 105, the donor 101 sets the BAP address of the node 106, and makes a notification of the BAP routing ID of the relay path when the node 106 transmits a signal to the donor 101 in an uplink. The donor 101 notifies the node 106 of the BAP address of the node 105 as information of the next transfer destination in the relay path. The node 106 holds the BAP address of the self-apparatus, and also holds the BAP routing ID and the next transfer destination information (the BAP address of the node 105) in association with each other. Note that in this case, the node 105 stores its BAP routing ID and next transfer destination information (the BAP address of a node 104). Similarly, the node 104 stores its BAP routing ID and next transfer destination information (the BAP address of the donor 101). The node 104 or 105 may acquire the information in a process in which the donor 101 transfers a message for notifying the node 106 of the BAP routing ID, or may acquire the information by a notification additionally received from the donor. Note that the donor 101 notifies the node 106 of the above-described setting information using, for example, an RRCReconfiguration message.

With respect to a relay path in a downlink to the node 106 as well, the donor 101 sets the identifier of the relay path. In this case, the donor 101 notifies, for example, the node 105 of the BAP routing ID of the relay path in which the node 106 is the next transfer destination. Similarly, the donor 101 notifies the node 104 of the BAP routing ID and next transfer destination information (the BAP address of the node 105). Note that the donor 101 can make this notification using a BH ROUTING CONFIGURATION message.

After that, the node 106 transmits a request message for setting an F1 interface to the donor 101 using the relay path in the uplink set as described above. This request message is, for example, an F1 SETUP REQUEST message. Upon receiving this message, the donor 101 transmits an F1 SETUP RESPONSE message to establish the F1 interface. The F1 interface is an interface established between the IAB donor and the IAB node but another interface may be set.

The relay path between the donor 101 and the node 106 can be used in both the uplink and the downlink, as described above. When transmitting a signal to the donor 101, the node 106 includes, in the signal, the BAP routing ID and the information of the donor 101 as destination information, and transmits the signal to the node 105 stored, in the self-apparatus, as the next transfer destination corresponding to the BAP routing ID. The node 105 transmits, based on the BAP routing ID included in the signal, the received signal to the node 104 stored, in the self-apparatus, as the next transfer destination corresponding to the BAP routing ID. Similarly, the node 104 transfers the signal to the donor 101. This allows the signal transmitted by the node 106 to reach the donor 101. Similarly, in the downlink as well, the donor 101 includes, in the signal, the BAP routing ID and the information of the node 106 as destination information, and transfers the signal to the node 104 as the next transfer destination corresponding to the BAP routing ID. Then, the node 104 transfers the signal to the node 105 stored as the next transfer destination corresponding to the BAP routing ID included in the signal. Similarly, the node 105 also transfers the signal to the node 106 stored as the next transfer destination corresponding to the BAP routing ID included in the signal. This allows the signal transmitted by the donor 101 to reach the node 106. As described above, when newly establishing connection to a relay node, the donor 101 sets an identifier in a relay path including the relay node, and causes each node to store the identifier and next transfer destination information in association with each other, thereby making the relay path usable. Note that a relay path can be set individually for each frequency band or each cell deployed by the donor or node. If, for example, radio links are established in the first frequency band and the second frequency band between the donor 101 and the node 104, the first relay path that uses the first frequency band between the donor 101 and the node 104 and the second relay path that uses the second frequency band between the donor 101 and the node 104 can be set as relay paths between the donor 101 and the node 106.

Relay transmission described above can be used by the donor 101 to provide a communication service outside a range within which radio waves emitted from the donor 101 can reach at a power level sufficient to provide the communication service or a range within which a terminal apparatus capable of emitting radio waves to reach the donor 101 at a sufficient power level can exist. That is, relay transmission can be used to extend the communicable range of the donor 101 to the periphery of nodes 102 and 103 and the nodes 104 to 106. As an example, when a node is arranged at a predetermined position (a position where it is possible to perform communication with the donor) such as a position by a window of a room, it is possible to provide a sufficiently high quality communication service to a terminal apparatus existing in the room.

For example, when a node is arranged in a moving body such as a train or bus that moves many terminal apparatuses at the same time, it is possible to provide a stable communication service to many terminal apparatuses that move together with the moving body. Note that in this case, for example, the node may need to switch a connection destination node along with the movement. Similarly, even a stationary node may need to switch a connection destination node in accordance with a change in radio environment or the like. In this case, the node is connected again to a donor or node existing on the periphery. However, with respect to a path including a radio link between the node and the connection destination at this time, setting of a BAP routing ID and the like are not executed, and thus this path does not function as an effective relay path. Therefore, the donor re-executes the above-described setting for the relay path after the switching. This can execute communication using the relay path after the switching.

Note that the node which has executed switching can delete the setting concerning the relay path before the switching by a message for instructing to delete the setting by designating the relay path, which has been transmitted from the donor to the node. Since this releases the BAP routing ID with respect to the relay path which cannot be used, the finite range of the BAP routing ID can be effectively used. On the other hand, there is a case in which the node cannot receive a message from the donor, for example, a case in which the radio link is unintentionally disconnected, and in this case, the node cannot delete the setting of the relay path, and may unnecessarily maintain the setting information of the unusable relay path. The identification information of the relay path and the like can be set individually for each donor. That is, two different donors are allowed to use the same identifier for usable relay paths. Therefore, if the node is connected to the second donor different from the first donor in the path before switching without deleting the setting of the relay path, based on the setting which has not been deleted, a signal that actually need not be transferred may be transferred or a signal may be transferred to an incorrect transfer destination. Therefore, according to the simplest procedure, the node is configured to reset (delete) the setting of the relay path when the radio link is disconnected (for example, a radio link failure occurs) or the connection destination is changed. However, in this procedure, when the connection destination is changed without changing the donor, the setting of the relay path is unwantedly reset. As a result, for example, if a relay path via a plurality of other nodes is set in the node, when the connection destination is changed with respect to only one of the plurality of other nodes, the setting of the entire relay path may be deleted. Furthermore, if the donor before switching the connection destination is different from the donor after switching the connection destination, the node needs to reset the F1 interface. On the other hand, if the donor before switching the connection destination is the same as the donor after switching the connection destination, the node need not reset the F1 interface.

In this embodiment, in consideration of the above-described status, the node determines whether the donor is changed when switching the connection destination, and changes, in accordance with the determination result, processing to be executed.

For example, if the donor is changed when switching the connection destination, the node executes the first processing including setting of the F1 interface (for example, transmission of an F1 SETUP RESPONSE message to the changed donor). Furthermore, the first processing may include, for example, reset of the information concerning the setting of the relay path stored in the node. At this time, the node can remove the information of the donor in the relay path together with the setting of the relay path. Note that the node may store, for each donor, the stored setting of the relay path in association with each donor. In this case, the first processing may include reading out the setting of the relay path associated with the changed donor and setting it. Note that the node may execute F1 interface reset processing regardless of the presence/absence of the change of the donor. That is, the first processing need not include setting of the F1 interface.

On the other hand, if the donor is not changed when switching the connection destination, the node can execute, for example, the second processing including setting of a relay path in a state in which the setting of the F1 interface is maintained. In this case, when, for example, RRC connection to the switched connection destination is established, the node stands by for transmission of a message for relay path setting processing from the donor. Then, in response to the message, the node executes, for example, processing of storing the BAP routing ID of the relay path in the uplink and the BAP address of the next transfer destination (switched connection destination) in association with each other. Note that if the setting information of the relay path including the switched connection destination as the next transfer destination is already held, the node may use the setting information. Note that the node may remove the setting information of the relay path concerning the connection destination before the switching or may hold the setting information intact unless the donor transmits an explicit deletion instruction.

To perform the above-described processing, the node needs to determine whether the donor is changed along with the change of the connection destination. At this time, the node receives a handover instruction (RRCReconfiguration message) including a physical cell identifier (physCellId) corresponding to the CU of the donor. Thus, assume that when the donor is changed, the physical cell identifier changes from that before the connection is switched. On the other hand, there is a case in which the same donor corresponds to a plurality of physical cell identifiers, and the node cannot always determine that the donor is changed even if the physical cell identifier is changed. That is, the donor cannot be specified only by the physical cell identifier. Therefore, in one example according to this embodiment, the donor notifies the relay apparatus of an identifier that is different from the physical cell identifier and can specify the donor. For example, the relay apparatus is notified of CellIdentity different from the physical cell identifier. Note that CellIdentity is merely an example, and the relay apparatus may be notified of other information. The donor can include such identifier in, for example, an RRCReconfiguration message, thereby sending a notification of the identifier of the donor to a node that is connected to the donor for the first time or a node that switches a connection destination. Furthermore, each relay apparatus may be notified, in advance, of information indicating the correspondence between the CU and the physical cell identifier. For example, the donor and the node connected to it may send a notification of information of the physical cell identifier of the CU of the donor by a broadcast signal. Furthermore, the donor and the node connected to it can notify a newly connected node of the physical cell identifier of the CU of the donor. In addition, a notification of information of the physical cell identifier of the CU of another donor on the periphery may also be sent. Therefore, in response to reception of the physical cell identifier of the donor after the connection is switched when the connection destination is changed, the node can determine whether the donor is changed along with the change of the connection destination.

Examples of the arrangement of the node that executes the above-described processing and the procedure of the processing to be executed will be described below.

(Apparatus Arrangement)

Figure 2:
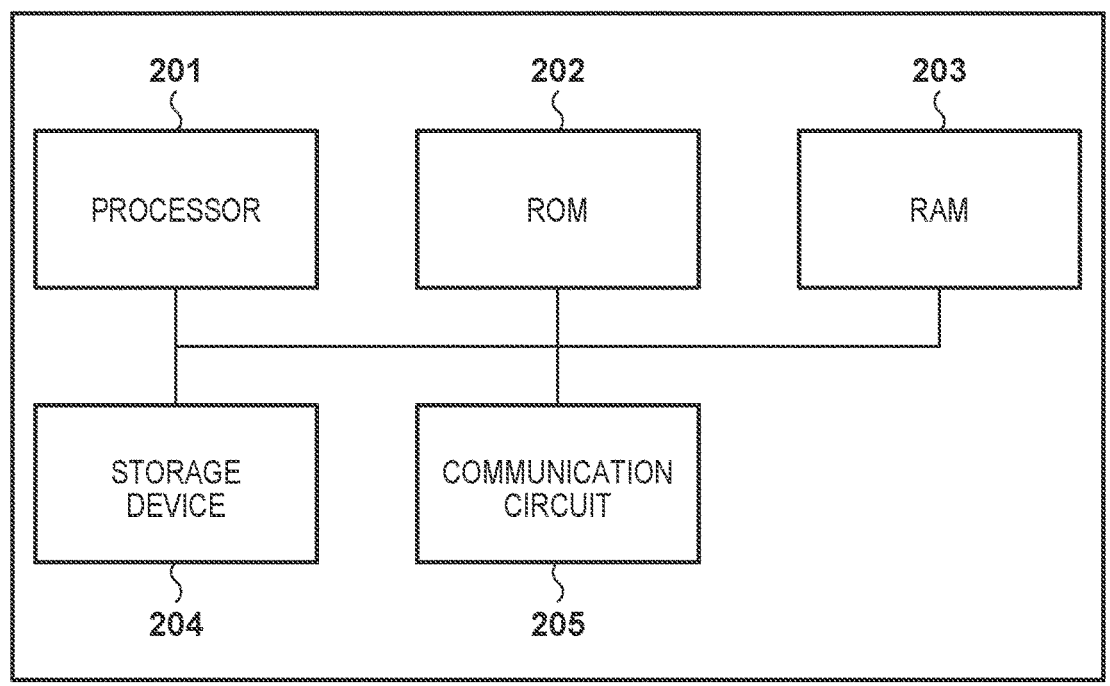
FIG. 2 is a block diagram showing an example of the hardware arrangement of a relay apparatus.

FIG. 2 shows an example of the hardware arrangement of the relay apparatus (IAB node) according to this embodiment. In one example, the relay apparatus is formed by including a processor 201, a ROM 202, a RAM 203, a storage device 204, and a communication circuit 205. The processor 201 is a computer formed by including one or more processing circuits such as a general-purpose CPU (Central Processing Unit) and an ASIC (Application-Specific Integrated Circuit), and executes the overall processing of the relay apparatus or each of the above-described processes by reading out a program stored in the ROM 202 or the storage device 204 and executing it. The ROM 202 is a read only memory that stores a program concerning processing executed by the relay apparatus and information such as various parameters. The RAM 203 is a random access memory that functions as a work space when the processor 201 executes the program, and stores temporary information. The storage device 204 is formed by, for example, a detachable external storage device. The communication circuit 205 is formed by, for example a wireless communication circuit. The relay apparatus is formed by including, as the communication circuit 205 for communication with another apparatus, an antenna, and a baseband circuit, an RF circuit, and the like for cellular communication. Note that one communication circuit 205 is shown in FIG. 2 but the relay apparatus can include a plurality of communication circuits. For example, in addition to a wireless communication circuit for communication with a terminal apparatus, the relay apparatus may include a wireless communication circuit for communication with the base station apparatus (IAB donor) or another relay apparatus. For example, the relay apparatus may include a wireless communication circuit for each frequency band, and may use a wireless communication circuit for a relatively high frequency band to communicate with the base station apparatus or another relay apparatus, and use a wireless communication circuit for a relatively low frequency band to communicate with the terminal apparatus.

Figure 3:
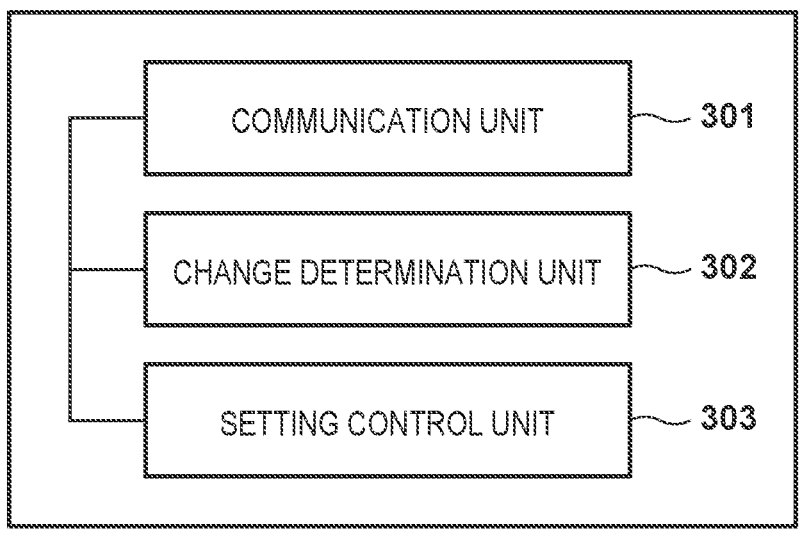
FIG. 3 is a block diagram showing an example of the functional arrangement of the relay apparatus.

FIG. 3 shows an example of the functional arrangement of the relay apparatus according to this embodiment. The relay apparatus includes a communication unit 301, a change determination unit 302, and a setting control unit 303 as functional components. Note that these functional components can be implemented when, for example, the processor 201 executes programs stored in the ROM 202 or the storage device 204. The present invention, however, is not limited to this, and for example, dedicated hardware in which at least one of these functions is implemented may be prepared.

In addition to wireless communication with the terminal apparatus, the communication unit 301 controls wireless communication with the base station apparatus (IAB donor) or another relay apparatus (IAB node). That is, the communication unit 301 executes various kinds of communication control operations for relaying communication between the base station apparatus and the terminal apparatus. If, for example, another relay apparatus or the base station apparatus of the connection destination is changed, the change determination unit 302 determines whether the base station apparatus (IAB donor) of the connection destination is changed before and after the change. For example, the change determination unit 302 can specify information capable of specifying the base station apparatus (IAB donor), such as CellIdentity, by a message at the time of changing the connection destination, as described above, and can determine, based on the specified information, whether the base station apparatus has been changed. Furthermore, the change determination unit 302 may acquire and hold in advance information for associating the base station apparatus and the physical cell identifier with each other, specify the base station apparatus by the physical cell identifier notified when an RRC message is received, and determine based on the specifying result whether the base station apparatus has been changed.

The setting control unit 303 makes various settings such as communication setting in the communication unit 301 and setting concerning a relay path for relay transmission. For example, in response to detection of a base station apparatus or another relay apparatus existing on the periphery, the setting control unit 303 establishes connection to one of those apparatuses by executing a random access procedure, and then executes processing of setting a relay path, as described above. For example, the setting control unit 303 acquires, by a message received from the base station apparatus (IAB donor), the BAP routing ID corresponding to the relay path and the BAP address of the next transfer destination of a signal in the relay path, and holds them. The setting control unit 303 also holds the BAP address of the self-apparatus. This makes it possible to perform relay transmission. Furthermore, when the connection destination is changed, the setting control unit 303 causes the change determination unit 302 to execute the above-described determination processing, and executes setting control processing corresponding to the determination result.

If the base station apparatus is changed in response to the change of the connection destination, the setting control unit 303 executes, as the first processing, F1 interface setting processing with the changed base station apparatus. In the first processing, all of the setting information of the relay path set with respect to the base station apparatus before the change can be reset. For example, setting information of a relay path may be saved for each base station apparatus. In this case, the setting information of the relay path used before the change of the base station apparatus is not removed and can be held in the storage device 204 or the like together with information (for example, CellIdentity) capable of specifying the base station apparatus. At this time, if the setting information of the relay path associated with the changed base station apparatus is stored, the setting control unit 303 may read out, from the storage device 204 or the like, the setting information as setting information to be used.

If the base station apparatus is not changed in response to the change of the connection destination, the setting control unit 303 maintains the F1 interface as the second processing. That is, in the second processing, F1 interface setting processing can be prevented from being executed. In this case, although the F1 interface is maintained, setting concerning a relay path via a new connection destination is made. Note that for example, in response to an instruction from the base station apparatus, the setting information of the relay path used before the change of the connection destination may be removed.

(Procedure of Processing)

Figure 4:
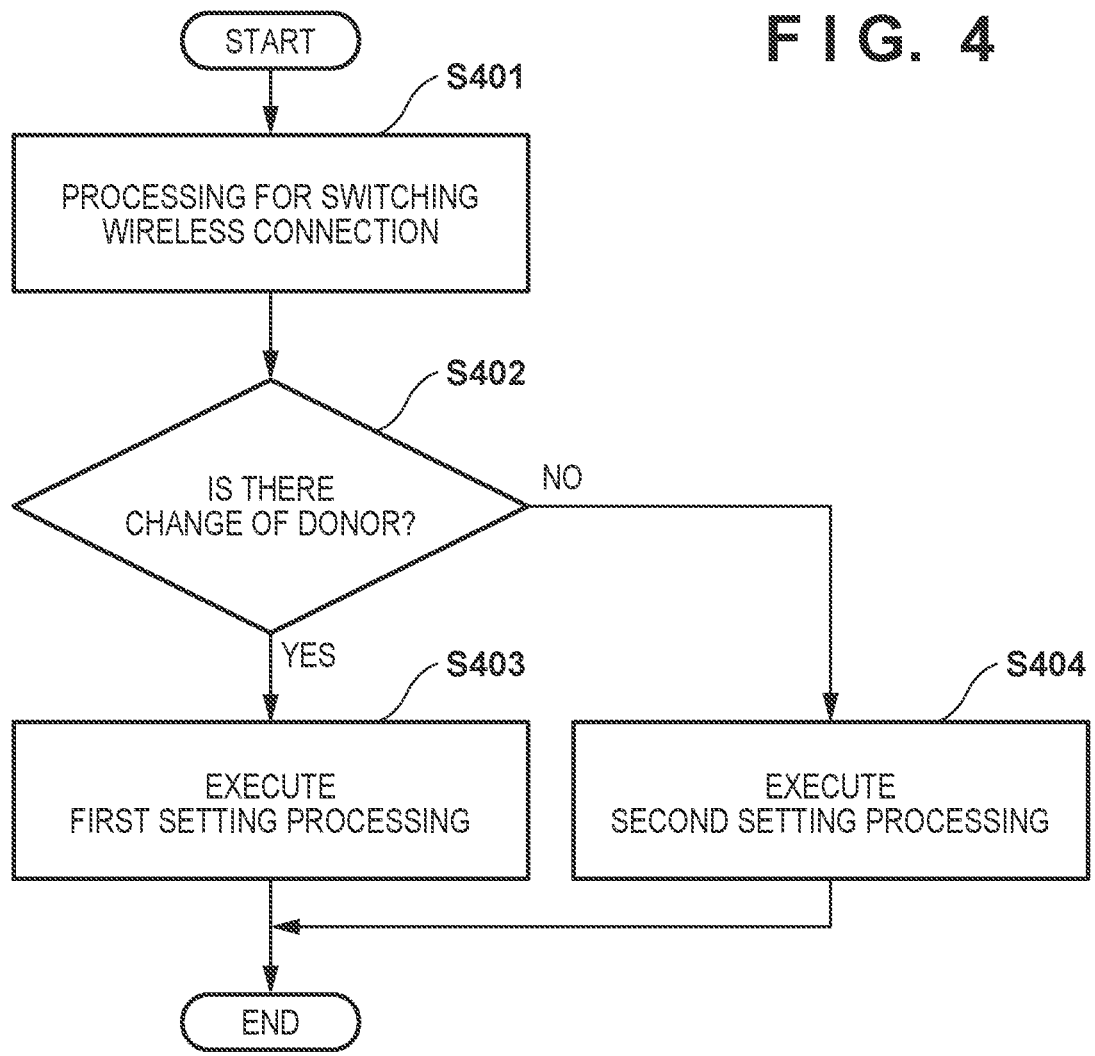
FIG. 4 is a flowchart illustrating an example of the procedure of processing executed by the relay apparatus.

FIG. 4 shows an example of the procedure of processing executed by the relay apparatus (IAB node) according to this embodiment. Note that details of each processing are as described above. Thus, an overview of the procedure of the processing will be described and a detailed description thereof will be omitted. This embodiment assumes that the relay apparatus is connected to one base station apparatus (IAB donor) directly or via another relay apparatus, and setting of a relay path and establishment of an F1 interface are complete. In this state, for example, in accordance with a deterioration in radio quality of the established wireless connection to the base station apparatus or the other relay apparatus, the relay apparatus switches the wireless connection to connection to another apparatus (S401). In response to the switching of the wireless connection, the relay apparatus determines whether the base station apparatus (donor) of the connection destination is changed (S402). For example, as described above, the relay apparatus can execute the determination processing in step S402 based on information capable of specifying the base station apparatus, such as CellIdentity, unlike the physical cell identifier. Alternatively, for example, the relay apparatus may acquire in advance information indicating the correspondence between the physical cell identifier and the base station apparatus, and execute the determination processing in step S402 based on, for example, the physical cell identifier acquired by an RRC message when performing the connection processing in step S401.

Then, if the relay apparatus determines that the base station apparatus is changed (YES in step S402), it executes F1 interface establishment processing and the first setting processing such as deletion of held settings (the BAP routing ID, the next transfer destination of the signal, the BAP address, and the like) concerning the relay path (S403). Note that if, for example, the setting information of the relay path connected to the base station apparatus is held together with the information capable of specifying the base station apparatus, the relay apparatus can disable the setting information of the relay path associated with the base station apparatus before the change. If the setting information of the relay path associated with the changed base station apparatus is held, the relay apparatus may enable the setting information. On the other hand, if the relay apparatus determines that the base station apparatus is not changed (NO in step S402), it executes the second setting processing such as deletion or disabling of the settings (the BAP routing ID, the next transfer destination of the signal, the BAP address, and the like) concerning the relay path used before the wireless connection is changed while maintaining the F1 interface (S404). Note that in this case, the relay apparatus may hold the setting information concerning the relay path used before the wireless connection is changed, without deleting or disabling it. Note also that if, for example, the setting information concerning the relay path after the change is not held in advance, the relay apparatus executes setting processing of the relay path. For example, the relay apparatus holds the BAP routing ID designated from the base station apparatus in the relay path after the change and information of the next transfer destination of the signal (and the BAP address, as necessary), and uses them in relay transmission thereafter.

In the above-described procedure, a relay path is flexibly set in a status in which various changes are made, thereby making it possible to appropriately execute relay transmission between a base station apparatus and a terminal apparatus.

According to present invention, it is possible to apply, to various statuses, communication using a relay path.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A relay apparatus for wirelessly relaying communication between a base station apparatus and a terminal apparatus, comprising:
   a determination unit configured to determine, when a connection destination apparatus of wireless connection in a relay path is changed while being connected to a first base station apparatus via a relay path, whether a base station apparatus connected via the changed connection destination apparatus is the first base station apparatus or a second base station apparatus different from the first base station apparatus; and
   a setting unit configured to execute, when the base station apparatus connected via the changed connection destination apparatus is the second base station apparatus, a first setting processing concerning a relay path after the change, and execute, when the base station apparatus connected via the changed connection destination apparatus is the first base station apparatus, a second setting processing different from the first setting processing and concerning a relay path after the change,
   wherein the first setting processing includes resetting information regarding a setting of the relay path used before changing the connection destination apparatus, while the second setting processing includes holding information regarding a setting of the relay path used before changing the connection destination apparatus.

2. The relay apparatus according to claim 1, wherein the setting unit makes, as the second setting processing, setting concerning the relay path after the change while maintaining an F1 interface already established with the first base station apparatus.

3. The relay apparatus according to claim 1, wherein the setting unit executes, as the first setting processing, processing of establishing an F1 interface with the second base station apparatus.

4. The relay apparatus according to claim 3, wherein the setting unit transmits, as the first setting processing, an F1 SETUP REQUEST message to the second base station apparatus.

5. The relay apparatus according to claim 1, wherein the setting unit removes, as the first setting processing, a setting of the relay path set with the first base station apparatus.

6. The relay apparatus according to claim 1, wherein the setting unit holds a setting of the relay path set with the first base station apparatus without removing the setting even while being connected to the second base station apparatus.

7. The relay apparatus according to claim 1, wherein the setting concerning the relay path includes storing, in association with each other, an identifier of the relay path and information indicating a next transfer destination of a signal in the relay path.

8. The relay apparatus according to claim 1, wherein the setting concerning the relay path includes storing information for specifying the relay apparatus used in relay transmission.

9. The relay apparatus according to claim 1, wherein the determination unit determines, based on an identifier received via the changed connection destination apparatus, whether the base station apparatus connected via the changed connection destination apparatus is the first base station apparatus or the second base station apparatus.

10. The relay apparatus according to claim 9, wherein the identifier is CellIdentity.

11. The relay apparatus according to claim 9, further comprising an acquisition unit configured to acquire, in advance, information for associating a base station apparatus and a physical cell identifier with each other, wherein the identifier is a physical cell identifier.

12. A control method executed by a relay apparatus for wirelessly relaying communication between a base station apparatus and a terminal apparatus, comprising:

determining, when a connection destination apparatus of wireless connection in a relay path is changed while being connected to a first base station apparatus via a relay path, whether a base station apparatus connected via the changed connection destination apparatus is the first base station apparatus or a second base station apparatus different from the first base station apparatus; and executing, when the base station apparatus connected via the changed connection destination apparatus is the second base station apparatus, a first setting processing concerning a relay path after the change, and executing, when the base station apparatus connected via the changed connection destination apparatus is the first base station apparatus, a second setting processing different from the first setting processing and concerning a relay path after the change, wherein the first setting processing includes resetting information regarding a setting of the relay path used before changing the connection destination apparatus, while the second setting processing includes holding information regarding a setting of the relay path used before changing the connection destination apparatus.

13. A non-transitory computer-readable storage medium that stores a program for causing a computer, included in a relay apparatus for wirelessly relaying communication between a base station apparatus and a terminal apparatus, to determine, when a connection destination apparatus of wireless connection in a relay path is changed while being connected to a first base station apparatus via a relay path, whether a base station apparatus connected via the changed connection destination apparatus is the first base station apparatus or a second base station apparatus different from the first base station apparatus, and execute, when the base station apparatus connected via the changed connection destination apparatus is the second base station apparatus, a first setting processing concerning a relay path after the change, and execute, when the base station apparatus connected via the changed connection destination apparatus is the first base station apparatus, a second setting processing different from the first setting processing and concerning a relay path after the change, wherein the first setting processing includes resetting information regarding a setting of the relay path used before changing the connection destination apparatus, while the second setting processing includes holding information regarding a setting of the relay path used before changing the connection destination apparatus.

* * * * *